United States Patent
Schneider et al.

(10) Patent No.: US 11,059,186 B2
(45) Date of Patent: Jul. 13, 2021

(54) VACCUM GRIPPER

(71) Applicant: J.Schmalz GmbH, Glatten (DE)

(72) Inventors: Fabian Schneider, Pfalzgrafenweiler (DE); Daniel Bienger, Fluorn-Winzeln (DE)

(73) Assignee: J.Schmalz GmbH, Glatten (DE)

( * ) Notice: Subject to any disclaimer, the term of this patent is extended or adjusted under 35 U.S.C. 154(b) by 0 days.

(21) Appl. No.: 16/839,540

(22) Filed: Apr. 3, 2020

(65) Prior Publication Data
US 2020/0338754 A1  Oct. 29, 2020

(30) Foreign Application Priority Data

Apr. 26, 2019 (DE) .................. 10 2019 110 913.2

(51) Int. Cl.
*B25J 15/00* (2006.01)
*B25J 15/06* (2006.01)

(52) U.S. Cl.
CPC ....... *B25J 15/0625* (2013.01); *B25J 15/0052* (2013.01)

(58) Field of Classification Search
CPC .......... B25J 15/0625; B25J 15/0052; B25J 15/0616; B25J 15/0683; B65G 47/91
USPC .................................... 294/65, 188; 901/40
See application file for complete search history.

(56) References Cited

U.S. PATENT DOCUMENTS

| | | | | |
|---|---|---|---|---|
| 2,903,290 A * | 9/1959 | Morris | ................... | A01K 43/00 294/65 |
| 3,865,420 A * | 2/1975 | Warren | .................. | B65G 47/91 294/184 |
| 4,674,785 A * | 6/1987 | Riesenberg | ........... | B25B 11/005 294/186 |
| 5,609,377 A | 3/1997 | Tanaka | | |
| 6,131,973 A * | 10/2000 | Trudeau | ............... | B25J 15/0616 294/186 |
| 2004/0094979 A1* | 5/2004 | Damhuis | ............. | B25J 15/0052 294/65 |
| 2006/0082172 A1 | 4/2006 | Clark et al. | | |
| 2008/0003092 A1* | 1/2008 | Baclija | ................. | B25J 19/0029 414/752.1 |

(Continued)

FOREIGN PATENT DOCUMENTS

DE   23 24 742 A1   11/1974
DE   93 07 335 U1   9/1993

(Continued)

*Primary Examiner* — Paul T Chin
(74) *Attorney, Agent, or Firm* — Aslan Law, P.C.

(57) ABSTRACT

A vacuum gripper comprising a base body having a suction side and an upper side, the suction side having a plurality of suction points and in each case a fixed number of suction points being combined to form a suction point group, a number of suction chambers (SC) corresponding to the number of suction point groups, each SC being assigned a suction point group, a distributor chamber (DC), the DC having at least a number of DC openings corresponding to the number of SC and a DC opening being flow-connected to a respective SC opening of a SC assigned thereto, and a plurality of valves, a valve being assigned to each suction point group and each valve having a valve channel. The respective valve is designed as a valve module having its own valve housing and the valve housing can be arranged on the upper side of the base body.

19 Claims, 4 Drawing Sheets

(56) References Cited

U.S. PATENT DOCUMENTS

Figure 1:
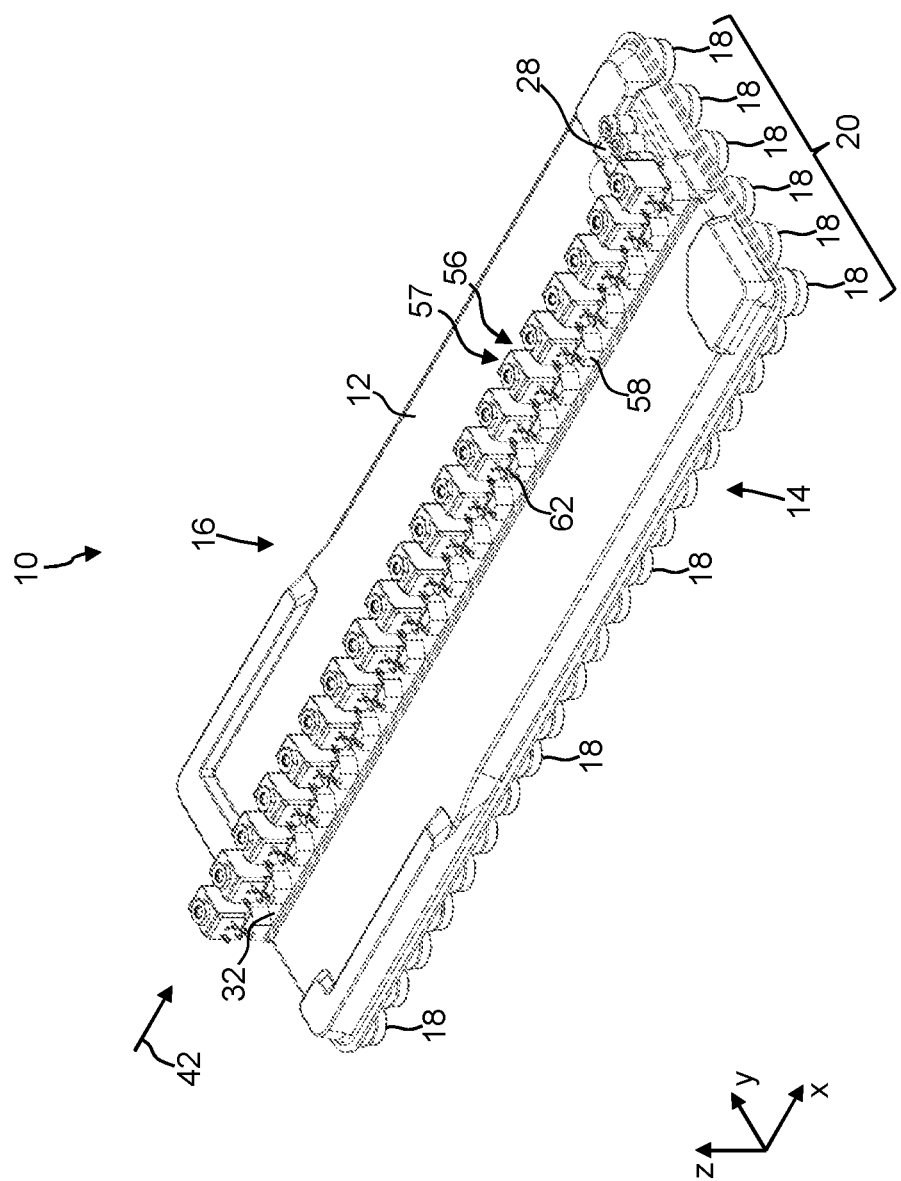

| | | | | |
|---|---|---|---|---|
| 2010/0244344 | A1* | 9/2010 | Mougin | B65B 23/08 |
| | | | | 269/21 |
| 2015/0360371 | A1* | 12/2015 | Harter | B25J 15/0625 |
| | | | | 294/186 |
| 2019/0030730 | A1* | 1/2019 | Tanaka | B25J 9/1697 |
| 2020/0130957 | A1* | 4/2020 | Borowski | B25J 15/0052 |

FOREIGN PATENT DOCUMENTS

| | | |
|---|---|---|
| DE | 102 16 221 C1 | 10/2003 |
| DE | 10 2009 043 043 B4 | 5/2013 |
| EP | 0 657 373 A2 | 6/1995 |

* cited by examiner

VACCUM GRIPPER

CROSS-REFERENCE TO RELATED APPLICATIONS

This application is a Continuation of DE 10 2019 110 913.2 filed on Apr. 26, 2019. This application claims priority to DE 10 2019 110 913.2 filed on Apr. 26, 2019, the entire contents of which are hereby incorporated by reference.

The invention relates to a large-area vacuum gripper for suctioning and handling objects according to the preamble of claim 1.

Such vacuum grippers have a large, mostly flat suction surface with a large number of suction points and are used, for example, for handling large-surface objects. In addition, surface vacuum grippers can be used to pick up a plurality of objects arranged side by side at the same time and to handle them. The objects are then suctioned side by side on the extended suction surface and thus fixed.

A vacuum gripper is known from DE 10 2009 043 043 B4, in which the suction points are divided into suction point groups and the suction point groups can be subjected to negative pressure independently of one another via respective suction chambers. This makes it possible to grip objects arranged next to one another in a selective and controlled manner without picking up surrounding objects. The known solutions have a complex structure, which regularly leads to a complex assembly and an increased outlay for maintenance.

The object of the present invention is to design a vacuum gripper that can be operated reliably and can be manufactured with little assembly effort. In addition, the maintenance effort required for the vacuum gripper is to be reduced.

This problem is solved by a large-area vacuum gripper having the features of claim 1.

The vacuum gripper comprises a gripper base body having a suction side and an upper side which faces away from the suction side. In this respect, the suction side and the upper side preferably limit the gripper base body in opposite directions.

The suction side has a multiplicity of suction points which can be subjected to negative pressure for the suction of an object. The suction points are preferably designed as suction openings in the suction side. The suction side can be provided with an elastic covering, for example foam, or a protective covering which has corresponding openings for the suction points. The suction points can also be equipped with separate suction heads (e.g. elastomer suction cups, suction bells, bellows suction cups) or other suction gripping devices.

The suction points can be arranged in groups and in this respect can have different distances from one another. But it can also be advantageous if the suction points are evenly distributed on the suction side, for example in an array. This makes it possible to provide a uniform suction power via the suction side if necessary.

A defined number of suction points is combined to form a suction point group. The suction points are combined, in particular, in that only the combined suction points open into a respectively assigned suction chamber, as described in more detail below. The suction points combined in a suction point group are in particular arranged directly adjacent to one another on the suction side. The suction points of a suction point group are preferably arranged as a particularly straight suction point row on the suction side of the gripper base body, the suction point row preferably being aligned longitudinally or transversely to a longitudinal extent of the gripper base body.

The vacuum gripper further comprises a number of suction chambers corresponding to the number of suction point groups, one suction point group being assigned to each suction chamber. The suction points of the respective suction point group open into the respective suction chamber. In this respect, the suction points of a respective suction point group are flow-connected to one another via the respective suction chamber and can be subjected to negative pressure.

The vacuum gripper further comprises a distributor chamber, which can be connected in particular to a vacuum supply. For this purpose, the gripper base body can have at least one vacuum connection, via which the distributor chamber can be evacuated.

The distributor chamber has a plurality of distributor chamber openings for supplying the suction chambers with negative pressure. In particular, the number of distributor chamber openings corresponds exactly to the number of suction chambers and each distributor chamber opening is assigned to exactly one suction chamber. However, it is also conceivable that a larger number of distributor chamber openings is provided, one or more distributor chamber openings being assigned to each suction chamber, for example in order to allow stronger flows. A distributor chamber opening is assigned to a suction chamber by the distributor chamber opening being flow-connected to a respective suction chamber opening of the suction chamber assigned thereto. In this respect, the suction chambers can be subjected to negative pressure via the distributor chamber. Preferably, therefore, only a vacuum connection on the distributor chamber is required in order to operate the vacuum gripper with vacuum. In particular, no separate vacuum connections are required on the suction chambers. It is also possible for a plurality of distributor chambers to be provided, a subset of the suction chambers being assigned to a respective distributor chamber.

The vacuum gripper also has a plurality of valves, each suction point group being assigned a valve in order to be able to activate and deactivate the suction points of the suction point group in a controlled manner. Each valve has a valve channel and a blocking device for blocking or unblocking the valve channel. By blocking or unblocking the valve channel, the suction chambers can be selectively pressurized with negative pressure, so that the respective suction point groups can be activated or deactivated independently of one another. This makes it possible to suction and handle adjacently situated objects independently of one another.

The valves are each designed as valve modules having their own valve housing. In particular, the valve housing encloses the valve channel and the blocking device. The valve channel preferably runs completely within the valve housing.

The distributor chamber openings and the suction chamber openings open into the upper side of the gripper base body separately from one another and in particular also at a distance from one another. In particular, a respective distributor chamber opening is flow-connected via a connecting channel to the suction chamber opening assigned thereto. A respective connection channel is formed by the valve channel of the respective valve, and in particular in such a way that the connection channel is provided entirely by the valve channel of the valve.

The distributor chamber openings and the suction chamber openings are each spatially assigned to one another and arranged in groups on the upper side. In each case, pairs comprising a respective distributor chamber opening and the suction chamber opening assigned to them are positioned such that they are flow-connected to one another via the valve channel of the respective valve module that is arranged on the upper side.

Because the distributor chamber openings and the suction chamber openings open into the upper side of the gripper base body, the valves can be arranged on the upper side of the gripper base body. The valve modules can be installed there in a simple manner, for example using a screw or insertable coupling. In addition, with such a configuration free access to the valves is possible even when the vacuum gripper is in an assembled state, so that the valves can be exchanged in a simple manner, for example as part of maintenance of the vacuum gripper. As a result, the maintenance effort for the vacuum gripper can be reduced.

Because the connecting channels are substantially formed by the valve channels, the suction chamber openings no longer have to be connected to the distributor chamber openings by means of hoses. This prevents hose connections from protruding spatially over the gripper base body. This can prevent the gripper from hitting or catching on projections. In addition, impairments to other machine parts are avoided, which is particularly important in large systems having a large number of moving units. Overall, additional components can be spared which connect the distributor chamber openings and/or suction chamber openings to the valves. With a vacuum gripper of this type, there are therefore fewer interfaces (for example hose connections, fittings, etc.), which represent potential weak points with regard to leaktightness of the vacuum gripper. This favors a reliable and robust mode of operation of the vacuum gripper.

Such a vacuum gripper can also be operated in an energy-efficient and therefore comparatively inexpensive manner, since the connecting channels can be kept short.

In addition, the maintenance effort can be significantly reduced since fewer interfaces, for example for possible leakage, have to be checked. Furthermore, a particularly compact design, in particular a low weight of the gripper base body, is achieved by such a configuration. When using such surface vacuum grippers in automated processing plants, lower masses must therefore be moved and energy can be saved.

It is particularly preferred if a respective connection channel is designed to be tubeless. In this way, the time required for the assembly of a vacuum gripper can be reduced further, since there is no need for complex laying and sealing of connecting hoses. In addition, such a vacuum gripper is comparatively inexpensive due to the savings on the hose material. In addition, such a vacuum gripper is characterized by a reliable operation and low maintenance requirements, since the hose connections, which are regularly susceptible to leakage, are eliminated.

The valve housing can be arranged, in particular fastened, on the upper side of the gripper base body. In this respect, the valves can be arranged in particular outside the distributor chamber and the suction chamber. The attachment is in particular designed such that it can be attached, detached and reattached. It is conceivable, for example, that the valve housing can be screwed to the upper side of the gripper base body by means of fastening screws. It is also conceivable that the respective valve housing can be releasably connected to the upper side of the base body via a quick-connect connection or via an insertable coupling. Such a modular arrangement of the valves enables the vacuum gripper to be conveniently serviced. In an alternative embodiment, it is also possible for the valves to jointly form a valve module which can be arranged on the upper side of the gripper base body.

A particularly advantageous embodiment consists in that the distributor chamber openings are arranged in a row, the row running along a first direction. The first direction is preferably oriented longitudinally or transversely with respect to a longitudinal extent of the gripper base body. In particular, the row of distributor chamber openings is straight. In particular, the suction chamber openings are also arranged in a row, which row is offset from the row of the distributor chamber openings. It is particularly preferred if the row of suction chamber openings runs parallel to the row of distributor chamber openings. The row of suction chamber openings is preferably arranged offset with respect to the row of distributor chamber openings in a direction orthogonal to the first direction. In this respect, the distributor chamber openings and the suction chamber openings can be arranged as a double row of distributor chamber openings and suction chamber openings arranged in pairs. Then the valve modules can be arranged as a particularly straight row on the upper side of the gripper base body, which favors a particularly space-saving arrangement of the valve modules.

The distributor chamber preferably extends along the first direction and the suction chambers respectively extend along a direction which is oriented orthogonally to the first direction. In this respect, the distributor chamber can at least partially cover the suction chambers. In this way, a particularly compact construction of the vacuum gripper is made possible.

In principle, it is possible for the distributor chamber and/or the suction chambers to be provided separately from the gripper base body. However, it is preferred if the distributor chamber or the suction chambers, in particular the distributor chamber and the suction chambers, are integrated in the gripper base body. In particular, the distributor chamber and/or the suction chambers are delimited by the gripper base body. In this respect, the distributor chamber and/or the suction chambers can be formed, for example, by cavities in the gripper base body. The vacuum gripper is then characterized by a particularly compact design. In particular, such a vacuum gripper can have a high mechanical load capacity having a low weight and a low overall height. It is particularly preferred if the gripper base body is designed as a one-piece and cohesive component. For example, it is conceivable that the gripper base body of the gripper is produced by means of a generative process (for example, 3D printing).

Furthermore, it is preferred if the respective distributor chamber opening and/or the respective suction chamber opening are/is designed as an opening or bore in the gripper base body. Such an embodiment enables simple manufacture of the vacuum gripper. It is particularly preferred if the bores or openings are orthogonal to the upper side of the gripper base body. Then the openings or bores can easily be made from above through the upper side, which further reduces the manufacturing effort.

Furthermore, it is preferred if the distributor chamber is designed as a groove-shaped recess in the upper side of the gripper base body, the recess being closed by a cover plate. The cover plate then forms the upper side of the gripper base body at least in sections. In particular, the distributor chamber openings open into the cover plate. Such a configuration enables the distributor chamber to be manufactured particularly easily. It is possible that the cover plate is designed as a component provided separately from the gripper base body. Then the cover plate can be releasably connected, for example screwed, to the gripper base body of the gripper. It is also possible for the cover plate to be formed in one piece with the gripper base body. The gripper base body can then be produced, for example, by means of a generative process (for example, 3D printing).

In an alternative preferred embodiment, the distributor chamber is formed by a cavity of a distributor module which is provided separately from the gripper base body and which can be arranged, in particular fastened, on the upper side of the gripper base body. In particular, the distributor module has its own module housing, which delimits the distributor chamber. For example, it is possible for the module housing to be produced as an extruded or extrusion-molded part, thereby achieving comparatively inexpensive production. For a simplified mounting of the distributor module on the gripper base body, it is also advantageous if the gripper base body has a corresponding recess for receiving the distributor module.

It is furthermore particularly preferred if the distributor module has a module underside and a module upper side, the module upper side, at least in sections, forming the upper side of the gripper base body in the assembled state of the distributor module. In particular, the distributor chamber openings are designed as openings or bores in the module upper side. In particular, the distributor module has a number of openings or bores corresponding to the number of suction chambers that pass through the distributor module from the module underside to the module upper side. The openings or bores are designed in particular to form the suction chamber openings when the distributor module is in the assembled state. In this respect, the suction chamber openings and the distributor chamber openings open into the module upper side of the distributor module. The valve modules can then be arranged on the module upper side of the distributor module. In this respect, the distributor module can form a common module with the valve modules. Such a modular vacuum gripper can be easily maintained and adapted to different purposes.

An advantageous embodiment provides that the respective valve is designed as a solenoid valve. The vacuum gripper can then be controlled purely electrically. In this way, the assembly of the vacuum gripper can be facilitated since, for example, pneumatic hose connections, which are difficult to assemble, are not required. In addition, the weight of the vacuum gripper can be reduced further.

The invention will be explained in more detail in the following with reference to the drawings.

Figure 2:
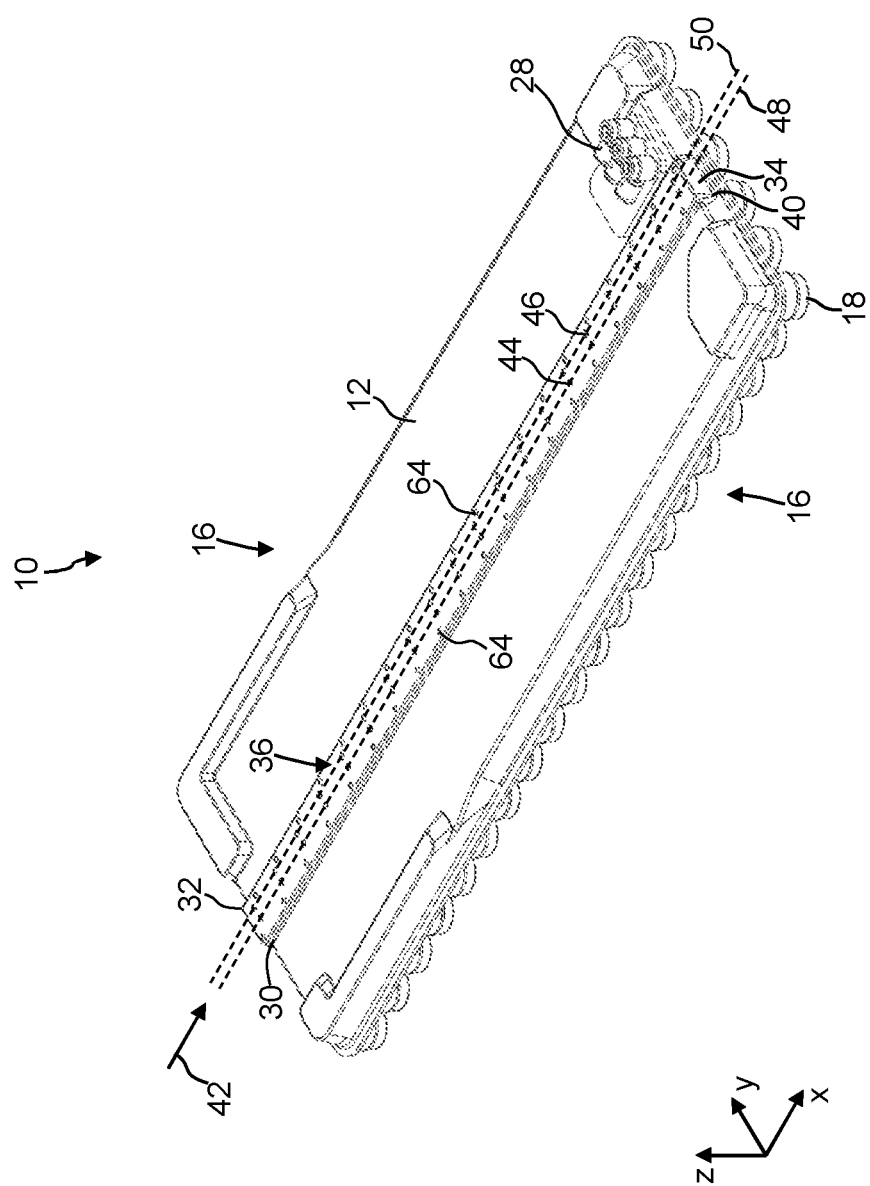
Figure 3:
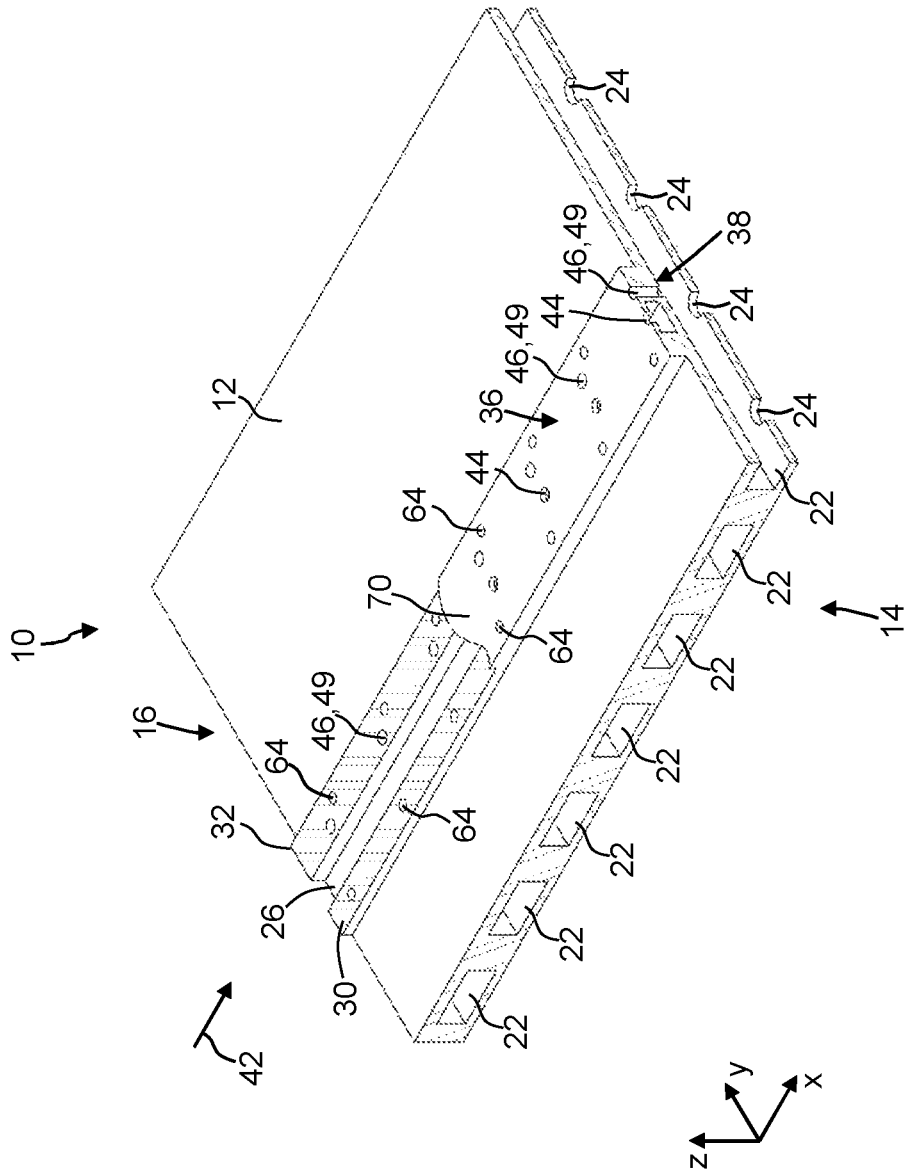
Figure 4:
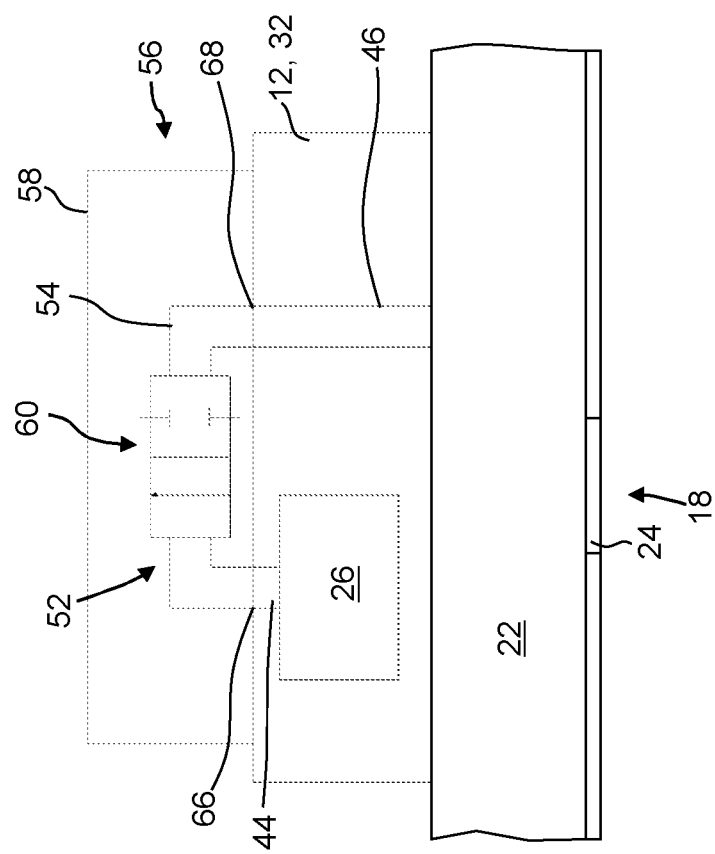

Shown in the drawings are:

FIG. 1 sketched representation of a vacuum gripper in a perspective view;

FIG. 2 sketched representation of the vacuum gripper according to FIG. 1, wherein the valves have been removed;

FIG. 3 sketched representation of a detail of a vacuum gripper in a partial sectional perspective view; and FIG. 4 schematic representation of the connection of a distributor chamber opening to a suction chamber opening in a partial sectional view.

In the following description and in the drawings, the same reference signs are used in each case for identical or corresponding features.

FIG. 1 shows a vacuum gripper, designated in its entirety by reference number 10, in a perspective view. The vacuum gripper 10 has an overall plate-like gripper base body 12 with a suction side 14 and an upper side 16, the upper side 16 facing away from the suction side 14. In this respect, the upper side 16 and the suction side 14 limit the gripper base body 12 in opposite directions. To explain the geometric relationships, a coordinate system is also shown in the figures, which has axes X, Y, Z orthogonal to one another.

The suction side 14 has a multiplicity of suction points 18, which in the example shown are designed as elastomer suction devices, in particular bellows suction devices. In the example shown, the suction points 18 are arranged in rows and columns in the manner of an array, the lines extending longitudinally with respect to a longitudinal extension of the gripper base body 12 (in the figures along the X direction) and the columns extending transversely with respect to the longitudinal extension of the gripper base body 12 (in the Figures along the Y direction). The suction points 18 of a column form a suction point group 20 (see FIG. 1).

The vacuum gripper 10 also has a number of suction chambers 22 corresponding to the number of suction point groups 20, each suction chamber 22 being assigned a suction point group 20 (see FIG. 3). The suction chambers 22 are formed by periodically spaced cavities in the gripper base body 12 that extend in a direction transverse to the longitudinal extent of the gripper base body 12 (i.e. in the Y direction in the figures).

The suction points 18 of a respective suction point group 20 open into the respective suction chamber 22 via corresponding bores 24 of the gripper base body 12; they are accordingly flow-connected to one another via the respective suction chamber 22 and via them can be collectively subjected to negative pressure (see FIG. 3).

The suction chambers 22 on their part can be subjected to negative pressure via a distributor chamber 26, the distributor chamber 26 in turn being connectable to a negative pressure generating device (not shown) via one or more negative pressure connections 28 (see FIGS. 2 and 3).

In the present example, the distributor chamber 26 is formed by a cavity of a module housing 30 of a distributor module 32, the cavity being closed at the end by means of sealing caps 34 (see FIGS. 2 and 3). In the present example, the distributor module 32 is designed as a component provided separately from the gripper base body 12 and has a module upper side 36 and a module underside 38 facing away from the module upper side 36. In the assembled state of the distributor module 32, the module upper side 36 forms sections of the upper side 16 of the gripper base body 12.

The distributor module 32 is arranged, for example, substantially centrally with respect to the transverse extent of the gripper base body 12 in a corresponding recess 40 of the gripper base body 12 and extends substantially longitudinally with respect to the longitudinal extent of the gripper base body 12 along a first direction 42 (in the figures in the X direction), preferably along the entire longitudinal extent of the gripper base body 12. The distributor module 32 can, however, also be arranged off-center, for example in an edge region of the gripper base body 12.

In the illustrated example, the cavity forming the distributor chamber 26 also extends along the first direction 42. In this respect, the distributor chamber 26 is oriented orthogonally with respect to the suction chambers 22 (see FIG. 3).

The distributor chamber 26 has a number of distributor chamber openings 44 corresponding to the number of suction chambers 22 for supplying the suction chambers 22 with negative pressure, each distributor chamber opening 44 being assigned a suction chamber opening 46 of a suction chamber 22 in the shown example.

The distributor chamber openings 44 are preferably formed as bores in the module upper side 36 of the distributor module 32 (see FIG. 3). By way of example, the distributor chamber openings 44 are preferably arranged in a straight row running along the first direction 42 (indicated in FIG. 2 by the dashed line designated by reference numeral 48).

In the example shown, the suction chamber openings 46 are likewise designed as bores 49 in the distributor module 32. The bores 49 pass through the distributor module 32 from the module upper side 36 to the module underside 38 and open at one end into the module upper side 36 and at the other end into the respective suction chamber 22 (see FIG. 3).

The suction chamber openings 46 are also arranged in a row (indicated in FIG. 2 by the broken line denoted by reference number 50), the row of the suction chamber openings 46, for example and preferably, running parallel to the row of the distributor chamber openings 44 and being arranged offset from it in a direction orthogonal to the first direction 42 (in the figures in the Y direction). The distributor chamber openings 44 and the suction chamber openings 46 consequently form a double row running along the first direction 42, consisting of paired distributor chamber openings 44 and suction chamber openings 46 (see FIGS. 2 and 3).

To supply the suction chambers 22 with negative pressure, each distributor chamber opening 44 is flow-connected to the suction chamber opening 46 assigned to it via a connecting channel 52 (shown schematically in FIG. 4). The respective connection channel 52 is formed by a valve channel 54 of a respective valve 56, as described in more detail below.

The valves 56 are designed as valve modules 57 with their own valve housing 58 which completely surrounds the valve channel (see FIG. 4). The valves 56 also have a blocking device 60 for blocking or unblocking the valve channel 54. The valves 56 can be designed, for example, as solenoid valves.

A valve 56 is assigned to each pair comprising a distributor chamber opening 44 and the suction chamber opening 46 associated therewith. For this purpose, the valve modules 57—along the double row of distributor chamber openings 44 and suction chamber openings 46—are arranged as a valve row on the module upper side 36 of the distributor module 32 and are releasably fixed there (see FIG. 1). In the present example, the valve modules 57 are screwed to the distributor module 32 via their respective valve housing 58 by means of fastening screws 62. For this purpose, the module housing 30 of the distributor module 32 has a plurality of screw bores 64 for receiving the fastening screws 62 (see FIGS. 2 and 3). Alternatively or additionally, the valve modules 57 can also be detachably connected to the distributor module 32 via an insertable coupling.

The valve modules 57 are arranged such that the respective valve channel 54 with its first opening 66 is flow-connected to the respective distributor chamber opening 44 and with its second opening 68 to the respective suction chamber opening 46. In particular, the valve channel 54 is directly connected to the distributor chamber opening 44 and the suction chamber opening 46, that is, without further components (for example hose connections) being provided for the flow connection of the distributor chamber opening 44 or the suction chamber opening 46 to the valve channel 54. In this respect, a respective distributor chamber opening 44 is flow-connected to its associated suction chamber opening 46 exclusively via the valve channel 54 of the valve 56; the connecting channel 52 is thus completely provided by the valve channel 54 of the respective valve 56. In this respect, the flow connection between the respective distributor chamber opening 44 and the associated suction chamber opening 46 is also established by fixing of the valve module 57.

The module housing 30 can also be made in one piece with the gripper base body 12 (indicated in FIG. 3). The distributor chamber 26 is then in particular formed as a groove-shaped recess in the upper side of the gripper base body 12, the recess being closed by a cover plate 70 (see FIG. 3). The distributor chamber openings 44 are then designed as bores in the cover plate 70.

The cover plate 70 can be designed as a component provided separately from the gripper base body 12. Then the cover plate 70 can be releasably connected, for example screwed, to the gripper base body 12. It is also possible for the cover plate 70 to be formed as one piece together with the gripper base body 12 as indicated in FIG. 3. In this case, the distributor chamber 26 is thus designed as a cavity in the gripper base body 12. The distributor chamber openings 44 and the suction chamber openings 46 are then in particular formed as bores in the upper side 16 of the gripper base body 12, the bores opening into the distributor chamber 26 and the suction chambers 22, respectively. Such a gripper base body 12 can be produced, for example, by means of a generative process (for example 3D printing).

In the case of a one-piece design of the gripper base body 12, the valve modules 57 are arranged on the cover plate 70 of the gripper base body 12.

The invention claimed is:

1. A vacuum gripper for suctioning and handling objects, the vacuum comprising
    a gripper base body having suction side and an upper side which faces away from the suction side, the suction side having a plurality of suction points and in each case a fixed number of suction points being combined to form a suction point group;
    a number of suction chambers corresponding to the number of suction point groups, each suction chamber being assigned a suction point group and the suction points the respective suction point group opening into the respective suction chamber;
    a distributor chamber, the distributor chamber having at least a number of distributor chamber openings corresponding to the number of suction chambers for supplying negative pressure to the suction chambers, one distributor chamber opening being assigned to one suction chamber respectively and being flow-connected to a respective suction chamber opening of the suction chamber assigned thereto; and
    a plurality of valves, one valve being assigned to each suction point group, each valve having a valve channel and a blocking device for blocking or unblocking the valve channel, wherein
    the respective valve is designed as a valve module having its own valve housing and in that the valve housing can be arranged on the upper side of the gripper base body, the distributor chamber openings and the suction chamber openings opening into the upper side of the gripper base body separately from one another, and the distributor chamber opening and the suction chamber opening being arranged in groups on the upper side such that a respective distributor chamber opening is flow-connected to the suction chamber opening assigned thereto via a connecting channel, which is formed by the valve channel of the respective valve module.

2. The vacuum gripper according to claim 1, wherein a respective connecting channel is formed tubeless.

3. The vacuum gripper according to claim 2, wherein the valve housing completely encloses the valve channel and the blocking device.

4. The vacuum gripper according to claim 3, wherein the valve module is releasably attachable on the upper side of the gripper base body.

5. The vacuum gripper according to claim 4, wherein the distributor chamber openings are arranged in a row, wherein the row runs along a first direction, in particular straight, and wherein the suction chamber openings are also arranged in a row, which row is offset, in particular parallel offset, with respect to the row of the distributor chamber openings, wherein the first direction is preferably oriented along or oblique with respect to a longitudinal extension of the gripper base body.

6. The vacuum gripper according to claim 5, wherein the distributor chamber extends along the first direction and wherein the suction chambers each extend along a direction which is oriented orthogonally with respect to the first direction.

7. The vacuum gripper according to claim 6, wherein the distributor chamber and/or the suction chambers are integrated in the gripper base body, in particular are enclosed by the gripper base body.

8. The vacuum gripper according to claim 7, wherein the respective distributor chamber opening and/or the respective suction chamber opening are/is designed as an opening or bore in the gripper base body, in particular as an opening or bore in the upper side.

9. The vacuum gripper according to claim 8, wherein the distributor chamber is configured as a groove-shaped recess in the upper side of the gripper base body which is closed off by a cover plate.

10. The vacuum gripper according to claim 7, wherein the distributor chamber is configured as a groove-shaped recess in the upper side of the gripper base body which is closed off by a cover plate.

11. The vacuum gripper according to claim 6, wherein the distributor chamber is formed separately from the gripper base body by a cavity of a distributor module, which can be arranged, in particular attached, on the upper side of the gripper base body.

12. The vacuum gripper according to claim 11, wherein the distributor module has a module underside and a module upper side, wherein the module upper side in the assembled state of the distributor module at least in sections forms the upper side of the gripper base body, and wherein the distributor module has a number of openings or bores corresponding to the number of suction chambers of the distributor module, which openings or bores pass from the module underside to the module upper side and which are designed, in the assembled state of the distributor module, to form the suction chamber openings.

13. The vacuum gripper according to claim 12, wherein the respective valve is designed as a solenoid valve.

14. The vacuum gripper according to claim 1, wherein the valve housing completely encloses the valve channel and the blocking device.

15. The vacuum gripper according to claim 1, wherein the valve module is releasably attachable on the upper side of the gripper base body.

16. The vacuum gripper according to claim 1, wherein the distributor chamber openings are arranged in a row, wherein the row runs along a first direction, in particular straight, and wherein the suction chamber openings are also arranged in a row, which row is offset, in particular parallel offset, with respect to the row of the distributor chamber openings, wherein the first direction is preferably oriented along or oblique with respect to a longitudinal extension of the gripper base body.

17. The vacuum gripper according, to claim 1, wherein the distributor chamber and/or the suction chambers are integrated in the gripper base body, in particular are enclosed by the gripper base body.

18. The vacuum gripper according to claim 1, wherein the distributor chamber is formed separately from the gripper base body by a cavity of a distributor module, which can be arranged, in particular attached, on the upper side of the gripper base body.

19. The vacuum gripper according to claim 1, wherein the respective valve is designed as a solenoid valve.

\* \* \* \* \*